US012650289B2

(12) United States Patent (10) Patent No.: US 12,650,289 B2
Ogasa et al. (45) Date of Patent: Jun. 9, 2026

(54) STRAIN GAUGE

(71) Applicant: MINEBEA MITSUMI Inc., Nagano (JP)

(72) Inventors: Yosuke Ogasa, Nagano (JP); Toshiaki Asakawa, Nagano (JP); Atsushi Kitamura, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 378 days.

(21) Appl. No.: 18/248,293

(22) PCT Filed: Oct. 13, 2021

(86) PCT No.: PCT/JP2021/037924
§ 371 (c)(1),
(2) Date: Apr. 7, 2023

(87) PCT Pub. No.: WO2022/080421
PCT Pub. Date: Apr. 21, 2022

(65) Prior Publication Data
US 2023/0375325 A1     Nov. 23, 2023

(30) Foreign Application Priority Data
Oct. 16, 2020     (JP) ................................. 2020-174819

(51) Int. Cl.
*G01B 7/16*                (2006.01)
(52) U.S. Cl.
CPC ..................................... *G01B 7/18* (2013.01)

(58) Field of Classification Search
CPC ............ G01B 7/18; G01B 7/20; G01L 1/2293
See application file for complete search history.

(56) References Cited

U.S. PATENT DOCUMENTS

| | | | | |
|---|---|---|---|---|
| 9,703,057 | B2 * | 7/2017 | Tsujita ................... | G02B 6/428 |
| 11,499,876 | B2 * | 11/2022 | Sato ....................... | H01C 7/003 |
| 11,796,404 | B2 * | 10/2023 | Toda ..................... | H05K 1/0393 |
| 2013/0301980 | A1 | 11/2013 | Tsujita et al. | |
| 2016/0216464 | A1 | 7/2016 | Tsujita et al. | |
| 2018/0217016 | A1 * | 8/2018 | Inamori ................... | G01B 7/18 |
| 2020/0309506 | A1 * | 10/2020 | Takata ..................... | G01B 1/00 |

(Continued)

FOREIGN PATENT DOCUMENTS

| | | |
|---|---|---|
| JP | S60-245763 | 12/1985 |
| JP | 2013-235104 | 11/2013 |
| JP | 2016-074934 | 5/2016 |

(Continued)

OTHER PUBLICATIONS

International Search Report of Int. Appl. No. PCT/JP2021/037924 dated Dec. 21, 2021.

*Primary Examiner* — Freddie Kirkland, III
(74) *Attorney, Agent, or Firm* — IPUSA, PLLC

(57) ABSTRACT
According to the present disclosure, a strain gauge has: a flexible substrate; a resistor formed on the substrate; and a pair of electrodes formed on the substrate and electrically connected with the resistor via conductive traces, and, in this strain gauge, the conductive traces include a first metal layer and a second metal layer formed over an upper surface of the first metal layer, and the second metal layer is formed in a pattern that is different from a pattern of the first metal layer.

16 Claims, 5 Drawing Sheets

(56) References Cited

U.S. PATENT DOCUMENTS

2021/0063258 A1     3/2021   Sato et al.
2025/0172444 A1*   5/2025   Ono ...................... G01L 1/2287

FOREIGN PATENT DOCUMENTS

JP     2019-078726     5/2019
JP     2020-126926     8/2020
WO    2015/045524     4/2015

* cited by examiner

STRAIN GAUGE

TECHNICAL FIELD

The present disclosure relates to a strain gauge.

BACKGROUND ART

There is known a strain gauge that is attached to a measurement object and detects the strain of the measurement object. The strain gauge has a resistor for detecting strain, and the resistor is formed, for example, on insulating resin. The resistor is connected to an electrode via a conductive trace, for example (see Patent Document 1, for example).

Citation List

Patent Document

Patent Document 1: Japanese Unexamined Patent Application Publication No. 2016-74934

SUMMARY OF THE INVENTION

Problem to be Solved by the Invention

A strain gauge is attached to a strain-generating body, and, by expanding and contracting following the movement of the strain-generating body, detects the amount of strain of the strain-generating body. Therefore, in order to detect a larger amount of strain, the strain gauge itself must not be damaged during the process of expansion and contraction, and needs to have higher anti-strain characteristics.

The present disclosure has been prepared in view of the above, and an object of the present disclosure is therefore to provide a strain gauge with improved anti-strain characteristics.

Means for Solving the Problem

According to the present disclosure, a strain gauge has: a flexible substrate; a resistor formed on the substrate; and a pair of electrodes formed on the substrate and electrically connected with the resistor via conductive traces, and, in this strain gauge, the conductive traces include a first metal layer and a second metal layer formed over an upper surface of the first metal layer, and the second metal layer is formed in a pattern that is different from a pattern of the first metal layer.

Advantageous Effects of the Invention

According to the technique disclosed herein, it is possible to provide a strain gauge with improved anti-strain characteristics.

EMBODIMENTS FOR CARRYING OUT THE INVENTION

Now, an embodiment of the present disclosure will be described below with reference to the accompanying drawings. In each drawing, the same components will be assigned the same reference signs and may in some cases not be described in a redundant manner.

First Embodiment

Figure 1:
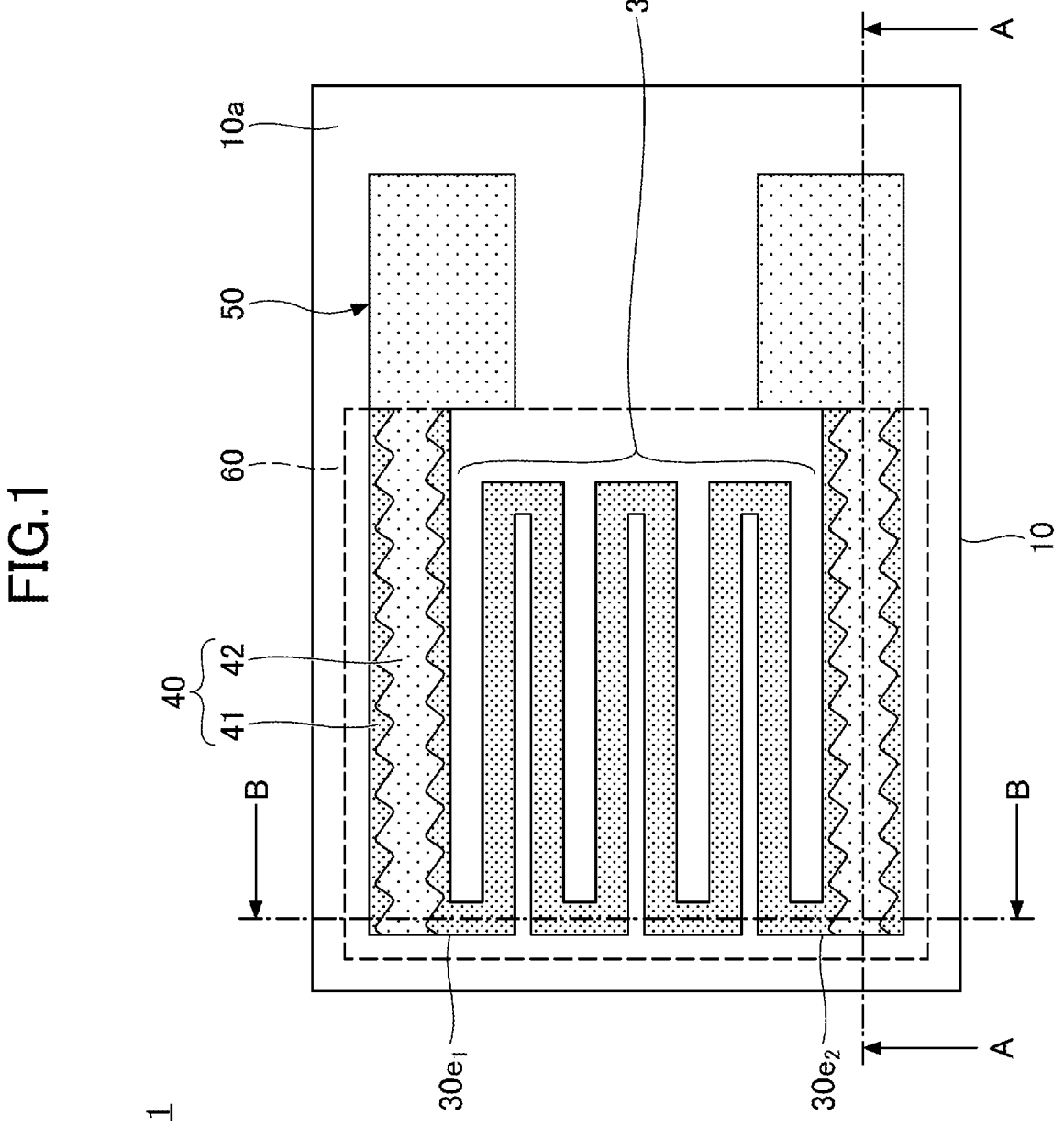
FIG. 1 is a plan view of an example of a strain gauge according to a first embodiment.
Figure 2:
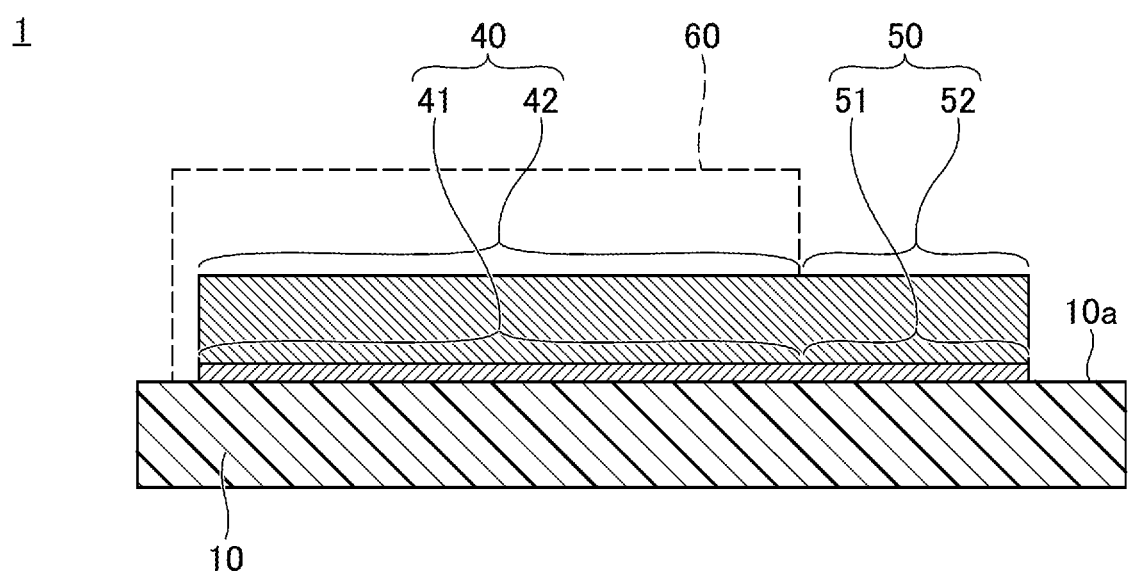
FIG. 2 is a cross-sectional view (example 1) that illustrates an example of the strain gauge according to the first embodiment.
Figure 3:
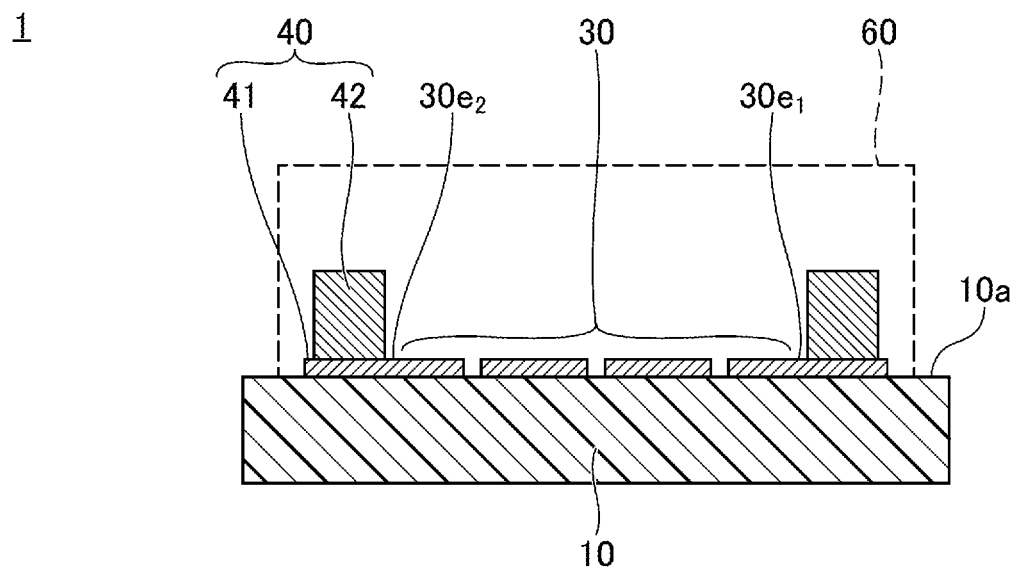
FIG. 3 is a cross-sectional view (example 2) that illustrates an example of the strain gauge according to the first embodiment.

FIG. 1 is a plan view that illustrates a strain gauge according to a first embodiment. FIG. 2 is a cross-sectional view that illustrates the strain gauge according to the first embodiment, showing a cross-section along line A-A in FIG. 1. FIG. 3 is a cross-sectional view that illustrates the strain gauge according to the first embodiment, showing a cross-section along line B-B in FIG. 1. Referring to FIG. 1 to FIG. 3, the strain gauge 1 has a substrate 10, a resistor 30, conductive traces 40, and electrodes 50.

Note that, with the present embodiment, for ease of explanation, the side of the substrate 10 in the strain gauge 1 on which the resistor 30 is provided will be referred to as the upper side or one side, and the side of the substrate 10 on which the resistor 30 is not provided will be referred to as the lower side or the other side. Furthermore, in each component or part, the surface on the side where the resistor 30 is provided will be referred to as one surface or the upper surface, and the surface on the side where the resistor 30 is not provided will be referred to as the other surface or the lower surface. However, the strain gauge 1 can be used upside down, or can be disposed at any angle. Furthermore, plan view herein means that an object is viewed from a direction normal to an upper surface 10a of the substrate 10, and plan shape herein refers to the shape of an object as viewed from a direction normal to the upper surface 10a of the substrate 10.

The substrate 10 is a member that serves as a base layer for forming the resistor 30 and the like, and is flexible. The thickness of the substrate 10 is not particularly limited and can be selected in accordance with the purpose of use. For example, the substrate 10 may be approximately 5 μm to 500 μm thick. In particular, it is preferable if the substrate 10 is 5 μm to 200 μm thick, because the transmission of strain from the surface of the strain generating body joined to the lower surface of the substrate 10 via a bonding layer or the like, the dimensional stability in the environment, and so forth are excellent. It is even more preferable if the substrate is 10 μm thick or more because the insulation is excellent.

The substrate 10 can be formed from an insulating resin film made of, for example, a polyimide (PI) resin, an epoxy resin, a polyether ether ketone (PEEK) resin, a polyethylene naphthalate (PEN) resin, a polyethylene terephthalate (PET) resin, a polyphenylene sulfide (PPS) resin, a polyolefin resin, and so forth. Note that a film herein refers to a flexible member that is approximately 500 μm thick or less.

Here, "the substrate 10 can be formed from an insulating resin film" by no means precludes the substrate 10 from containing fillers, impurities, and so forth, in the insulating resin film. The substrate 10 may be formed from, for example, an insulating resin film that contains fillers such as silica or alumina.

Examples of materials of the substrate 10 other than resin include crystalline materials such as $SiO_2$, $ZrO_2$ (including YSZ), Si, $Si_2N_3$, $Al_2O_3$ (including sapphire), ZnO, perovskite ceramics ($CaTiO_3$, $SaTiO_3$, etc.) and so forth. Further, additional examples include amorphous glass and the like. Furthermore, as materials of the substrate 10, metals such as aluminum, an aluminum alloy (duralumin), titanium, and others may be used. In this case, for example, an insulating film is formed on the substrate 10 of metal.

The resistor 30 is a thin film formed on the substrate 10 in a predetermined pattern, and is a sensitive part that changes its resistance in response to strain. The resistor 30 may be formed directly on the upper surface 10a of the substrate 10, or may be formed on the upper surface 10a of the substrate 10 via other layers. Note that, in FIG. 1, the resistor 30 is shown with a dark satin pattern for ease of explanation.

The resistor 30 has a plurality of elongated parts, arranged at predetermined intervals with their longitudinal directions oriented in the same direction (the direction of line A-A in FIG. 1), and the ends of adjacent elongated parts are alternately connected to form a zigzag structure on the whole. The longitudinal direction of the elongated parts is the grid direction, and the direction perpendicular to the grid direction is the grid width direction (the direction of line B-B in FIG. 1).

Ends of the two elongated parts in the longitudinal direction, located on the outermost side in the grid width direction, are bent in the grid width direction, and form respective ends $30e_1$ and $30e_2$ of the resistor 30 in the grid width direction. The ends $30e_1$ and $30e_2$ of the resistor 30 in the grid width direction are electrically connected to the electrodes 50 via the conductive traces 40. In other words, the conductive traces 40 electrically connect the ends $30e_1$ and $30e_2$ of the resistor 30 in the grid width direction, with the electrodes 50.

The resistor 30 can be made of, for example, a material containing Cr (chromium), a material containing Ni (nickel), or a material containing both Cr and Ni. That is, the resistor 30 can be made of a material containing at least one of Cr and Ni. Materials containing Cr include, for example, a Cr composite film. Materials containing Ni include, for example, Cu—Ni (copper nickel). Materials containing both Cr and Ni include, for example, Ni—Cr (nickel chromium).

Here, a Cr composite film refers to a composite film of Cr, CrN, $Cr_2N$, and the like. A Cr composite film may contain incidental impurities such as chromium oxide.

The thickness of the resistor 30 is not particularly limited and can be selected in accordance with the purpose of use. The resistor 30 can be, for example, approximately 0.05 μm to 2 μm thick. In particular, it is preferable if the resistor 30 is 0.1 μm thick or more, because the crystallinity of crystals (for example, the crystallinity of α-Cr) constituting the resistor 30 improves. It is even more preferable if the resistor is 1 μm thick or less, because the cracks in the film constituting the resistor 30 due to the film's internal stress, and the warping of the film from the substrate 10 can be reduced. The width of the resistor 30 can be optimized in accordance with the required specifications such as the resistance value and the lateral sensitivity, and can be set to, for example, about 10 μm to 100 μm in consideration of disconnection countermeasures.

For example, if the resistor 30 is a Cr composite film, the stability of gauge characteristics can be improved by using α-Cr (alpha-chromium), which has a stable crystalline phase, as the main component. Additionally, when the resistor contains α-Cr as its main component, the strain gauge 1 can have a gauge factor of 10 or higher, as well as a gauge factor temperature coefficient TCS and a resistance temperature coefficient TCR in the range of −1000 ppm/degrees Celsius to +1000 ppm/degrees Celsius. Here, "the main component" means that the substance of interest takes up 50% or more, by weight, of all substances constituting the resistor. It is preferable if the resistor 30 contains 80% or more of α-Cr by weight, and more preferable if the resistor 30 contains 90% or more of α-Cr by weight, from the perspective of improving the gauge characteristics. Note that α-Cr is a Cr having a bcc structure (body-centered cubic structure).

Also, when the resistor 30 is a Cr composite film, the CrN and $Cr_2N$ contained in the Cr composite film are preferably 20% or less by weight. When the CrN and $Cr_2N$ contained in the Cr composite film are 20% or less by weight, the decrease in the gauge ratio can be reduced.

Furthermore, the proportion of $Cr_2N$ in CrN and $Cr_2N$ is preferably 80% or more by weight and less than 90% by weight, and, more preferably, 90% or more by weight and less than 95% by weight. When the proportion of $Cr_2N$ in CrN and $Cr_2N$ is 90% or more by weight and less than 95% by weight, $Cr_2N$, which has semiconductor-like properties, makes the decrease of TCR (negative TCR) more noticeable. Furthermore, reduced use of ceramic materials enables the reduction of brittle fracture as well.

Meanwhile, when a small amount of $N_2$ or atomic N gets mixed or is present in the film, the external environment (for example, high temperature environment) might make them escape from the film, which might result in a change in the film stress. By creating a chemically stable CrN, a stable strain gauge can be obtained without generating the above unstable N.

The conductive traces 40 are formed on the substrate 10. The conductive traces 40 include a first metal layer 41 and a second metal layer 42, which is formed over the upper surface of the first metal layer 41. Note that, in FIG. 1, for ease of explanation, the second metal layer 42 and the electrodes 50 are shown with a satin pattern that is sparser than that of the resistor 30 and the first metal layer 41.

Studies by the inventors have shown that the narrower the width of the first metal layer 41 of the conductive traces 40, the less likely cracks or disconnection will occur when the conductive traces are strained. To be more specific, in an experiment, the inventors prepared strain gauges in which the first metal layer 41 is 10 μm wide, 100 μm wide, 345 μm wide, and 560 μm wide, and, by preparing several of each strain gauge and straining each strain gauge, investigated the occurrence of cracks and disconnection. Note that, in this experiment, the first metal layer 41 was a Cr composite film having a thickness of 0.2 μm, and the second metal layer 42 was not laminated over the first metal layer 41.

As a result of the experiment, it was confirmed that, as the width of the first metal layer 41 narrowed, cracks and disconnection tended to occur less, and it was found that the strain limit depended on the width of the first metal layer 41. Note that the strain limit is the mechanical strain value at which cracks or disconnection begin to occur when strain is applied to the strain gauge.

Figure 4:
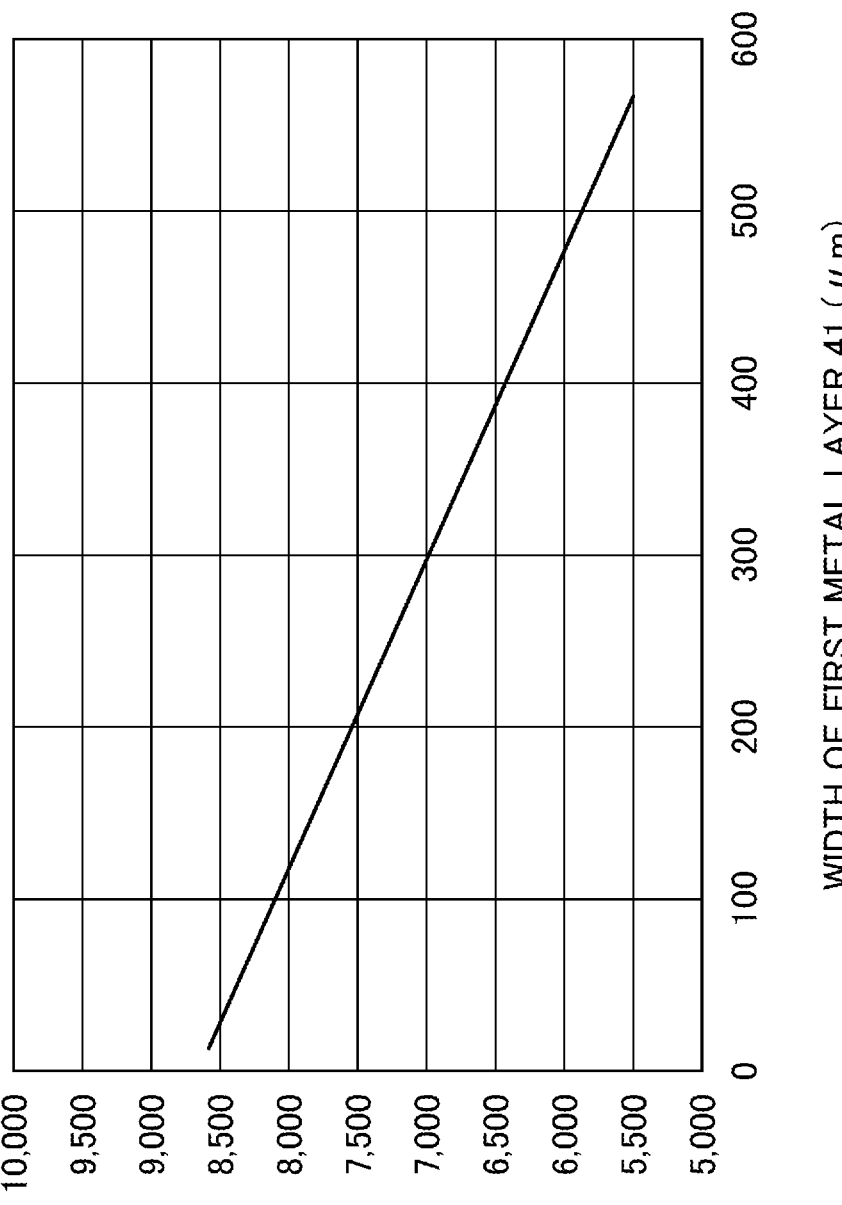
FIG. 4 is a diagram that illustrates an experimental result of strain limit.

FIG. 4 is a diagram that illustrates an experimental result of strain limit, plotting the minimum strain limit values for multiple test strain gauges. As shown in FIG. 4, the inventors' experimental result shows that the strain limit is 5500με or more when the width of the first metal layer 41 is 560 μm, whereas the strain limit is 8500με or more when the width of the first metal layer 41 is 10 μm. That is, when the width of the first metal layer 41 is 10 μm, the strain limit is about 1.5 times as large as when the width of the first metal layer 41 is 560 μm. Also, when the width of the first metal layer 41 is in between from 560 μm to 10 μm, the strain limit improves approximately linearly.

This result was obtained because brittle fracture is likely to occur when the width of the first metal layer 41 made of a Cr composite film having a high elastic modulus is wide, and because narrowing the width of the first metal layer 41 led to improved apparent fracture resistance. When the strain gauge 1 is actually used, a strain limit of about 8000με is required, so the width of the first metal layer 41 is preferably 100 μm or less. On the other hand, it is difficult to make the width of the first metal layer 41 less than 10 μm during the manufacturing process. Considering this, it is likely that the width of the first metal layer 41 is preferably 10 μm or more and 100 μm or less.

Also, another study conducted by the inventors has shown that, when a copper layer that is 3-μm thick is formed in a solid manner as a second metal layer 42 over the first metal layer 41, the strain limit further improves by 1.5 to 2 times compared to the case the second metal layer is not formed, regardless of the width of the first metal layer 41. Since the copper layer has greater elasticity than the Cr composite film, it is likely that the strain limit further improves by laminating the copper layer over the Cr composite film.

That is, from the perspective of achieving further improvement of strain limit, it is preferable if the second metal layer 42 is made of a material that has greater elasticity than that of the first metal layer 41. Materials that having greater elasticity than the Cr composite film include gold, silver, and aluminum, in addition to copper. Similar results may be obtained even when these materials are used for the second metal layer 42.

Also, according to a further study by the inventors, in the conductive traces 40, it is preferable to form the second metal layer 42 over a selected region of the upper surface of the first metal layer 41, instead of forming the second metal layer 42 solidly so as to cover the entire upper surface of the first metal layer 41. This will be explained in detail below.

Based on various studies such as described above, the inventors have found out that, when the strain gauge 1 is strained, the stress tends to concentrate on the interface between the first metal layer 41 and the second metal layer 42, and that this concentration of stress is highly likely to cause disconnection of the conductive traces 40, as well as accompanying disconnection of the resistor 30. Disconnection of the resistor 30 leads to a decrease in the strain limit.

Generally, in the conductive traces 40, the second metal layer 42 is formed solidly so as to cover the entire upper surface of the first metal layer 41. However, according to this structure, since the first metal layer 41 and the second metal layer 42 have the same pattern, the direction of the stress produced at the interface between the first metal layer 41 and the second metal layer 42 is determined solely by the pattern of the conductive traces 40. Therefore, restrictions in design become more severe, and, for example, the resistor 30 needs to be placed so as to avoid the influence of the stress produced at the interface between the first metal layer 41 and the second metal layer 42.

Therefore, with the present disclosure, as shown in FIG. 1, in the conductive traces 40, the second metal layer 42 is not formed solidly so as to cover the entire upper surface of the first metal layer 41, and, instead, the second metal layer 42 is formed in a selected region of the upper surface of the first metal layer 41. That is, the second metal layer 42 is formed in a pattern that is different from that of the first metal layer 41.

To be more specific, for example, in FIG. 1, the first metal layer 41 has a linear pattern, and the second metal layer 42 has a wavy pattern. However, the first metal layer 41 is not limited to a linear shape, and can have any pattern. Also, the first metal layer 41 can be of any length. Also, the first metal layer 41 may be formed such that its width is the narrowest on the resistor 30 side and increases gradually toward the electrodes 50.

In the structure according to the present disclosure, since the second metal layer 42 is formed in a pattern that is different from that of the first metal layer 41, in plan view, a part of the region of the upper surface of the first metal layer 41 is exposed from the second metal layer 42. Also, according to the structure of the present disclosure, in plan view, the second metal layer 42 includes a part that extends obliquely with respect to the direction in which the first metal layer 41 extends. For example, the first metal layer 41 extends in the direction of line A-A in FIG. 1, while the second metal layer 42 includes a part that extends obliquely with respect to the direction of line A-A in FIG. 1. Note that the pattern shape of the second metal layer 42 is neither the same as nor similar to the pattern shape of the first metal layer 41.

In this way, in the conductive traces 40 in which the second metal layer 42 is laminated over the first metal layer 41, by forming the second metal layer 42 in a pattern that is different from that of the first metal layer 41, the direction of the stress produced at the interface between the first metal layer 41 and the second metal layer 42 can be controlled.

That is, when the first metal layer 41 and the second metal layer 42 have the same pattern, the direction of the stress produced at the interface between the first metal layer 41 and the second metal layer 42 is determined solely by the pattern of the conductive traces 40 (=first metal layer 41). However, according to the structure of the present disclosure, by designing the pattern of the second metal layer 42 well, it becomes possible to produce stress in a direction that is different from the direction in which the pattern of the first metal layer 41 extends.

For example, if, in FIG. 1, the first metal layer 41 and the second metal layer 42 had the same pattern, stress would be produced in the direction of line A-A, along which the conductive traces 40 extends, so that the part of the resistor 30 that extends parallel to line A-A would be more likely to be influenced by the stress. In this case, it would be necessary to change the location of the resistor 30, change the routing of the conductive traces 40, and so forth, so that the resistor 30 would be less influenced by the stress, but this in turn would lower the degree of freedom in design.

Meanwhile, if the second metal layer 42 includes a part that extends obliquely with respect to the direction in which the first metal layer 41 extends, stress is produced obliquely with respect to line A-A. Therefore, it is possible to alleviate the influence of stress on the part of the resistor 30 that extends parallel to line A-A, so that it is possible to improve the strain limit while maintaining the degree of freedom of design.

In other words, the direction of stress is controlled by the pattern of the second metal layer 42 such that the stress produced at the interface between the first metal layer 41 and the second metal layer 42 has little impact on the resistor 30, thereby improving the strain limit while still maintaining the degree of freedom of design.

That is, the strain gauge 1 is attached to the strain-generating body, and, by expanding and contracting following the movement of the strain-generating body, detects the amount of strain of the strain-generating body. Therefore, in order to detect a larger amount of strain, the strain gauge 1 itself must not be damaged (must not be disconnected, for example) during the process of expansion and contraction, and therefore is required to have higher anti-strain characteristics. By forming the second metal layer 42 in a pattern that is different from that of the first metal layer 41 in the strain gauge 1, it is possible to improve the strain limit (high anti-strain characteristic) while maintaining the degree of freedom of design.

Note that the second metal layer 42 may be formed in a wavy pattern that is more similar to a sinusoidal wave, or may be formed in a wavy pattern that is more similar to a triangular wave or a sawtooth wave. Also, the period of waves may be adjusted as appropriate if needed. Also, the width of the second metal layer 42 may be adjusted as appropriate. Also, the width of the second metal layer 42 need not be uniform.

The electrodes 50 are formed on the substrate 10 and electrically connected to the resistor 30 via the conductive traces 40. For example, the electrodes 50 are wider than the conductive traces 40 and formed in a substantially rectangular shape. The electrodes 50 are a pair of electrodes for outputting the strain-induced changes in the resistance value of the resistor 30 to the outside, and are connected to the lead conductive traces for external connection, for example.

The electrodes 50 have a pair of a first metal layer 51 and a second metal layer 52 laminated over the upper surface of a corresponding first metal layer 51. The first metal layer 51 is electrically connected to the ends $30e_1$ and $30e_2$ of the resistor 30 via the first metal layer 41 of the conductive traces 40. The first metal layer 51 is formed in a substantially rectangular shape in plan view. The first metal layer 51 may be formed to have the same width as the first metal layer 41 of the conductive traces 40.

Note that the resistor 30, the first metal layer 41, and the first metal layer 51 are assigned different reference signs for ease of explanation, but they can be formed integrally from the same material in the same process. Therefore, the resistor 30, the first metal layer 41, and the first metal layer 51 have substantially the same thickness. Furthermore, although the second metal layer 42 and the second metal layer 52 are assigned different reference signs for ease of explanation, they can be formed integrally from the same material in the same process. Therefore, the second metal layer 42 and the second metal layer 52 have substantially the same thickness.

The second metal layers 42 and 52 are preferably made of a material having a lower resistance than the resistor 30 (the first metal layers 41 and 51). For example, when the resistor 30 is a Cr composite film, the material of the second metal layers 42 and 52 having a lower resistance than the Cr composite film may be Cu, Ni, Al, Ag, Au, or Pt, an alloy of any of these metals, a compound of any of these metals, or a laminated film obtained by appropriately laminating any of these metals, alloys, or compounds. Among these, when Cu, Au, and Ag are selected as the material of the second metal layer 42, they are preferable because of their excellent elasticity as described above. The thickness of the second metal layers 42 and 52 is not particularly limited and can be appropriately selected according to the purpose of use.

The second metal layer 52 may be formed in part of the upper surface of the first metal layer 51 or may be formed over the entire upper surface of the first metal layer 51. For example, the second metal layer 52 may be made a copper layer, and a gold layer may be laminated over the upper surface of the copper layer. Alternatively, the second metal layer 52 may be made a copper layer, and a palladium layer and a gold layer may be sequentially laminated over the upper surface of the copper layer. The solder wettability of the electrodes 50 can be improved by making the uppermost layer of the electrodes 50 a gold layer.

Also, the conductive traces 40 has a structure in which a second metal layer 42 is laminated over a first metal layer 41 made of the same material as the resistor 30. Therefore, the resistance of the conductive traces 40 becomes lower than that of the resistor 30, so that it is possible to prevent the conductive traces 40 from functioning as a resistor. As a result of this, the accuracy of strain detection by the resistor 30 can be improved.

In other words, by providing the conductive traces 40 having a lower resistance than the resistor 30, it is possible to limit the part of the strain gauge 1 that practically serves as the sensing part, to the local region where the resistor 30 is formed. Therefore, the accuracy of strain detection by the resistor 30 can be improved.

In particular, in a highly sensitive strain gauge that uses a Cr composite film as the resistor and that has a gauge factor of 10 or more, making the resistance of the conductive traces 40 lower than that of the resistor 30 and limiting the practical sensing part to the local region where the resistor is formed, a remarkable effect of improving the accuracy of strain detection can be achieved. Furthermore, making the resistance of the conductive traces 40 lower than that of the resistor 30 also provides an effect of reducing lateral sensitivity.

A cover layer 60 (insulating resin layer) may be provided over the upper surface 10a of the substrate 10 so as to cover the resistor 30 and the conductive traces 40 and expose the electrodes 50. By providing the cover layer 60, the resistor 30 and the conductive traces 40 can be prevented from, for example, getting mechanically damaged. Furthermore, by providing the cover layer 60, the resistor 30 and the conductive traces 40 can be protected from moisture and the like. Note that the cover layer 60 may be provided so as to cover all parts except for the electrodes 50.

The cover layer 60 can be formed from an insulating resin such as a PI resin, an epoxy resin, a PEEK resin, a PEN resin, a PET resin, a PPS resin, or a composite resin (for example, a silicone resin or a polyolefin resin). The cover layer 60 may contain fillers or pigments. The thickness of the cover layer is not particularly limited and can be selected in accordance with the purpose of use, and may be, for example, approximately 2 μm to 30 μm.

To manufacture the strain gauge 1, first, the substrate 10 is prepared, and a metal layer (referred to as "metal layer A" for ease of explanation) is formed over the upper surface 10a of the substrate 10. The metal layer A is a layer that in the end is patterned to become the resistor 30, the first metal layer 41, and the first metal layer 51. Therefore, the material and thickness of the metal layer A are the same as those of the resistor 30, the first metal layer 41, and the first metal layer 51 described above.

The metal layer A can be formed, for example, by magnetron sputtering which uses, as a target, a raw material that can form the metal layer A. The metal layer A may be formed by using reactive sputtering, vapor deposition, arc ion plating, pulse laser deposition, and so forth, instead of magnetron sputtering.

From the perspective of achieving stable gauge characteristics, before forming the metal layer A, it is preferable to vacuum-form a functional layer of a predetermined thickness as an underlying layer, over the upper surface 10a of the substrate 10 by, for example, conventional sputtering.

In the present disclosure, a functional layer refers to a layer having a function of promoting the crystal growth of at least the upper metal layer A (resistor 30). The functional layer preferably further has a function of preventing oxidation of the metal layer A due to the oxygen and moisture contained in the substrate 10, a function of improving the adhesion between the substrate 10 and the metal layer A, and so forth. The functional layer may also have other functions as well.

The insulating resin film that constitutes the substrate 10 contains oxygen and moisture. In particular, when the metal layer A contains Cr, Cr forms a self-autoxidized film, and it is therefore effective if the functional layer has a function of preventing oxidation of the metal layer A.

The material of the functional layer is not particularly limited as long as it at least has a function of facilitating the crystal growth of the resistor 30, which is an upper layer, and can be selected in accordance with the purpose of use. The material may be, for example, one or more types of metals selected from the group consisting of Cr (chromium), Ti (titanium), V (vanadium), Nb (niobium), Ta (tantalum), Ni (nickel), Y (yttrium), Zr (zirconium), Hf (hafnium), Si (silicon), C (carbon), Zn (zinc), Cu (copper), Bi (bismuth), Fe (iron), Mo (molybdenum), W (tungsten), Ru (ruthenium), Rh (rhodium), Re (rhenium), Os (osmium), Ir (iridium), Pt (platinum), Pd (palladium), Ag (silver), Au (gold), Co (cobalt), Mn (manganese), and Al (aluminum), an alloy of some of the metals in this group, or a compound of some of the metals in this group.

Examples of the above alloy include FeCr, TiAl, FeNi, NiCr, CrCu, and the like. Examples of the above compound include TiN, TaN, $Si_3N_4$, $TiO_2$, $Ta_2O_5$, $SiO_2$, and the like.

When the functional layer is formed from a conductive material such as a metal or an alloy, the film thickness of the functional layer is preferably ¹⁄₂₀ or less of the film thickness of the resistor. When the film thickness of the functional layer is in this range, it is possible to facilitate the crystal growth of α-Cr, and prevent a situation where part of the current flowing in the resistor flows into the functional layer and causes a decrease in the sensitivity of strain detection.

When the functional layer is formed from a conductive material such as a metal or an alloy, the film thickness of the functional layer is more preferably ¹⁄₅₀ or less of the film thickness of the resistor. When the film thickness of the functional layer is in this range, it is possible to facilitate the crystal growth of α-Cr, and prevent, more effectively, a situation where part of the current flowing in the resistor flows into the functional layer and causes a decrease in the sensitivity of strain detection.

When the functional layer is formed from a conductive material such as a metal or an alloy, the film thickness of the functional layer is even more preferably ¹⁄₁₀₀ or less of the film thickness of the resistor. When the film thickness of the functional layer is in this range, it is possible to prevent, even more effectively, a situation where part of the current flowing in the resistor flows into the functional layer and causes a decrease in the sensitivity of strain detection.

When the functional layer is formed from an insulating material such as an oxide or a nitride, the film thickness of the functional layer is preferably 1 nm to 1 µm. When the film thickness of the functional layer is in this range, it is possible to facilitate the crystal growth of α-Cr, and form a film with ease without forming cracks in the functional layer.

When the functional layer is formed from an insulating material such as an oxide or a nitride, the film thickness of the functional layer is more preferably 1 nm to 0.8 µm. When the film thickness of the functional layer is in this range, it is possible to facilitate the crystal growth of α-Cr, and form a film even more easily without forming cracks in the functional layer.

When the functional layer is formed from an insulating material such as an oxide or a nitride, the film thickness of the functional layer is even more preferably 1 nm to 0.5 µm. When the film thickness of the functional layer is in this range, it is possible to facilitate the crystal growth of α-Cr, and form a film even more easily without forming cracks in the functional layer.

Note that the plan shape of the functional layer is patterned substantially the same as the plan shape of the resistor illustrated in FIG. 1, for example. However, the plan shape of the functional layer does not necessarily have to be substantially the same as the plan shape of the resistor. When the functional layer is formed from an insulating material, it does not have to be patterned in the same shape as the plan shape of the resistor. In this case, the functional layer may be formed solidly at least in the region where the resistor is formed. Alternatively, the functional layer may be formed solidly over the entire upper surface of the substrate 10.

Also, when the functional layer is formed from an insulating material, the functional layer may be made relatively thick, such as 50 nm thick or more and 1 µm thick or less, and may be formed in a solid shape, so that the thickness and the surface area of the functional layer increase, and the heat that is generated when the resistor warms up can be readily dissipated to the substrate 10 side. As a result of this, with the strain gauge 1, it is possible to reduce the decrease of the accuracy of measurement due to the resistor's self-heating.

The functional layer can be vacuum-formed by, for example, conventional sputtering, in which a raw material that can form the functional layer is used as a target and an Ar (argon) gas is introduced into a chamber. By using conventional sputtering, the functional layer is formed while the upper surface 10a of the substrate 10 is being etched with Ar, and therefore it is possible to form the functional layer only in a minimal amount, and achieve an effect of improved adhesion.

However, this is simply one example of the method of forming the functional layer, and the functional layer may be formed by using other methods as well. For example, a method may be used here in which: before the functional layer is formed, the upper surface 10a of the substrate 10 is activated by plasma treatment using Ar or the like, so as to gain an adhesion improving effect; and subsequently, the functional layer is vacuum-formed by magnetron sputtering.

The combination of the material of the functional layer and the material of the metal layer A is not particularly limited and can be selected in accordance with the purpose of use. For example, it is possible to form a Cr composite film by using Ti as the main component of the functional layer and α-Cr (alpha-chromium) as the main component of the first metal layer.

In this case, the first metal layer can be formed by magnetron sputtering, in which a raw material that can form the functional layer is used as a target, and an Ar gas is introduced into a chamber. Alternatively, reactive sputtering, which targets pure Cr and introduces an appropriate amount of nitrogen gas into a chamber with an Ar gas, may be used to form the metal layer A. In this case, by changing the amount and pressure (nitrogen partial pressure) of nitrogen gas to be introduced, adjusting the heating temperature by providing a heating step, and so forth, it is possible to adjust the proportions of CrN and Cr₂N contained in the Cr composite film, as well as the proportion of Cr₂N in CrN and Cr₂N.

According to these methods, the growth surface of the Cr composite film is defined based on the functional layer consisting of Ti, and a Cr composite film, in which α-Cr having a stable crystalline structure is the main component, can be formed. Also, Ti that constitutes the functional layer is diffused in the Cr composite film, so that improved gauge characteristics can be gained. For example, the gauge factor of the strain gauge 1 can be made 10 or more, and the gauge factor temperature coefficient TCS and the resistance temperature coefficient TCR can be kept in the range of −1000 ppm/degrees Celsius to +1000 ppm/degrees Celsius. Note that, when the functional layer is formed from Ti, the Cr composite film might contain Ti or TiN (titanium nitride).

Note that, when the metal layer A is a Cr composite film, the functional layer consisting of Ti has all of the function of facilitating the crystal growth of the metal layer A, the function of preventing oxidation of the metal layer A due to the oxygen or moisture contained in the substrate 10, and the function of improving the adhesion between the substrate 10 and the metal layer A. The same applies when Ta, Si, Al, or Fe is used for the functional layer, instead of Ti.

In this way, by providing a functional layer in a lower layer of the metal layer A, it becomes possible to facilitate the crystal growth of the metal layer A, and fabricate a first metal layer consisting of a stable crystalline phase. As a result of this, the stability of gauge characteristics in the strain gauge 1 can be improved. Furthermore, since the material to constitute the functional layer is diffused in the metal layer A, the strain gauge 1 can have improved gauge characteristics.

Next, on the upper surface of the metal layer A, a second metal layer 42 and a second metal layer 52 are formed. The second metal layer 42 and the second metal layer 52 can be formed by photolithography, for example.

To be more specific, first, a seed layer is formed to cover the upper surface of the metal layer A by, for example, sputtering or electroless plating. Next, a photosensitive resist is formed over the entire upper surface of the seed layer, then exposed and developed to form openings for exposing the regions where the second metal layer 42 and the second metal layer 52 are to be formed. At this time, the pattern of the second metal layer 42 can be made into an arbitrary shape by adjusting the shape of the opening of the resist. For the resist, for example, a dry film resist or the like can be used.

Next, the second metal layer 42 and the second metal layer 52 are formed over the seed layer exposed in the openings, for example, by electroplating using the seed layer as a power supply path. Electroplating is suitable in that the takt time is high and low-stress electroplated layers can be formed as the second metal layer 42 and the second metal layer 52. The strain gauge 1 can be prevented from warping by reducing the stress of the thick electroplated layer. Note that the second metal layer 42 and the second metal layer 52 may be formed by electroless plating.

Next, the resist is removed. The resist can be removed, for example, by immersing it in a solution that can dissolve the material of the resist.

Next, a photosensitive resist is formed over the entire upper surface of the seed layer, exposed and developed, and patterned into a planar shape similar to the resistor 30, the conductive traces 40, and the electrodes 50 in FIG. 1. For the resist, for example, a dry film resist or the like can be used. Then, using the resist as an etching mask, the metal layer A and the seed layer exposed from the resist are removed, and the resistor 30, the conductive traces 40 and the electrodes 50 having the planar shape shown in FIG. 1 are formed.

For example, wet etching can remove the unwanted parts of the metal layer A and the seed layer. When a functional layer is formed under the metal layer A, the functional layer is patterned, by etching, into the planar shape shown in FIG. 1, as the resistor 30, the conductive traces 40, and the electrodes 50. Note that, at this point, a seed layer is formed over the resistor 30, the first metal layer 41, and the first metal layer 51.

Next, using the second metal layer 42 and the second metal layer 52 as an etching mask, the second metal layer 42 and the second metal layer 52 are formed by removing the unnecessary seed layer exposed from the second metal layer 42 and the second metal layer 52. Note that the seed layer immediately below the second metal layer 42 and the second metal layer 52 remains. For example, the unwanted seed layer can be removed by wet etching, by using an etchant that etches the seed layer but does not etch the functional layer, the resistor 30, the conductive traces 40, and the electrodes 50.

Subsequently, if necessary, a cover layer is provided over the upper surface 10a of the substrate 10 to cover the resistor 30 and the conductive traces 40, and expose the electrodes 50, thereby completing the strain gauge 1. The cover layer can be produced, for example, by laminating a semi-cured thermosetting insulating resin film over the upper surface 10a of the substrate 10, so as to cover the resistor 30 and the conductive traces 40, and expose the electrodes 50, followed by curing by heating. The cover layer may be produced by coating the upper surface 10a of the substrate 10 with a liquid or paste thermosetting insulating resin so as to cover the resistor 30 and the conductive traces 40, and expose the electrodes 50, followed by curing by heating.

Figure 5:
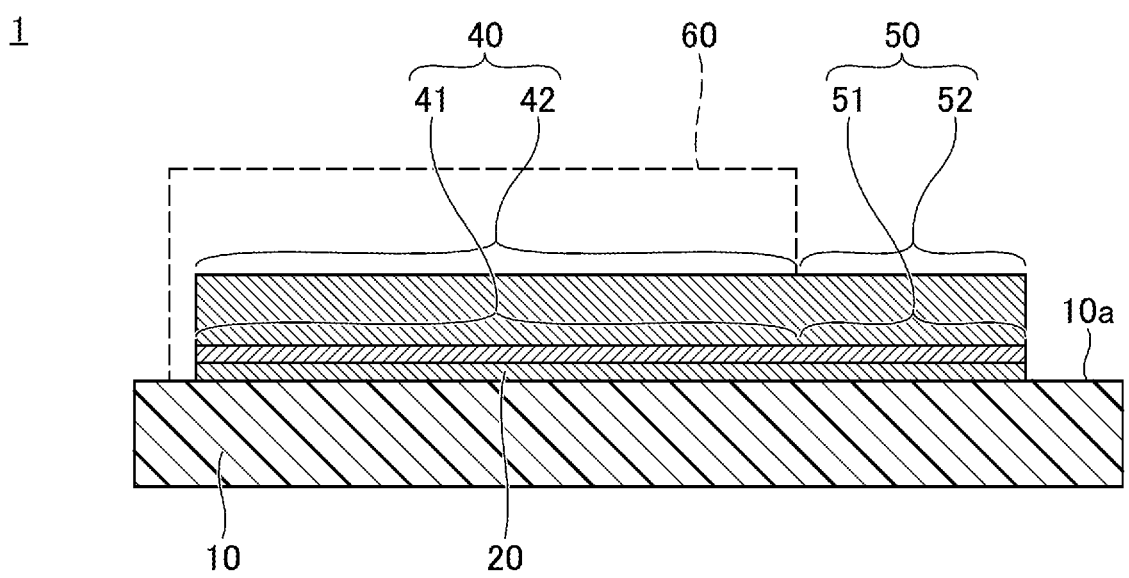
FIG. 5 is a cross-sectional view (example 3) that illustrates an example of the strain gauge according to the first embodiment.

Note that, when a functional layer is provided on the upper surface 10a of the substrate 10 as a base layer for the resistor 30, the first metal layer 41, and the first metal layer 51, the strain gauge 1 has the cross-sectional shape shown in FIG. 5. The layer denoted by the reference sign 20 is the functional layer. The planar shape of the strain gauge 1 when the functional layer 20 is provided is, for example, the same as that shown in FIG. 1. However, as described above, the functional layer 20 may be formed solidly in part or all of the upper surface of the substrate 10. Note that the functional layer 20 is extremely thin compared to the resistor 30 and the first metal layer 41, so that the presence or absence of the functional layer 20 is likely to have no effect on the strain limits of the resistor 30 and the first metal layer 41.

<Modification 1 of the First Embodiment>

A modification 1 of the first embodiment shows an example in which the pattern of the second metal layer is different from that of the first embodiment. Note that, in modification 1 of the first embodiment, the description of components that are the same as those of the above-described embodiment might be omitted.

Figure 6:
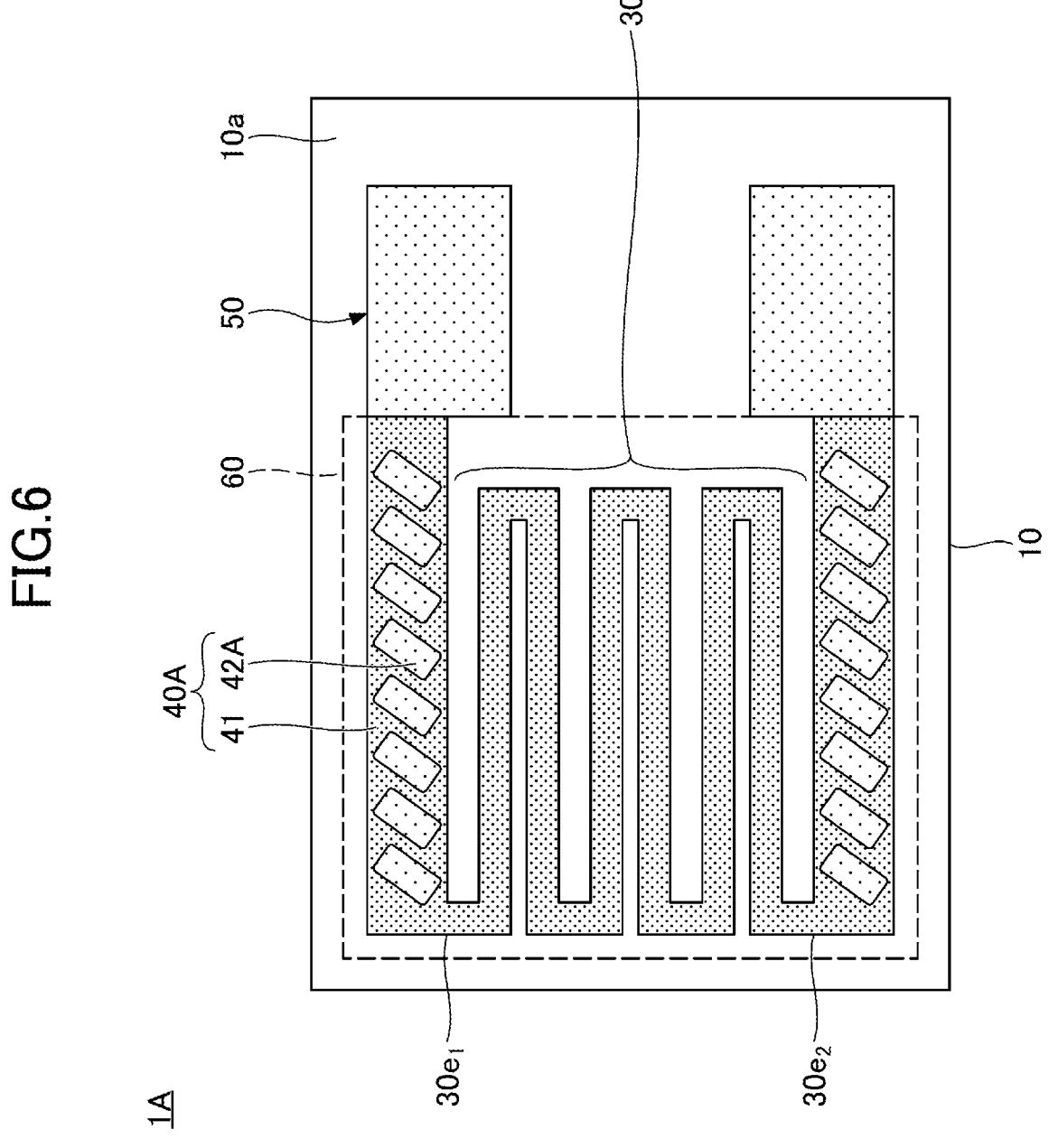
FIG. 6 is a cross-sectional view that illustrates an example of the strain gauge according to a modification 1 of the first embodiment.

FIG. 6 is a plan view that illustrates a strain gauge according to modification 1 of the first embodiment. Note that the cross-sectional structure of the strain gauge according to modification 1 of the first embodiment is the same as in FIG. 2 and FIG. 3.

Referring to FIG. 6, a strain gauge 1A differs from the strain gauge 1 (see, for example, FIG. 1) in that the conductive traces 40 are replaced with conductive traces 40A. The conductive traces 40A are formed on the substrate 10 in the strain gauge 1A. The conductive traces 40A have a first metal layer 41 and a second metal layer 42A laminated over the upper surface of the first metal layer 41. The conductive traces 40A are not limited to a straight line, and may form any pattern. Also, the conductive traces 40A can be of any length. Also, the conductive traces 40A may be shaped such that the width is the narrowest on the resistor 3C side and widens gradually toward the electrodes 50. Note that, in FIG. 6, the second metal layer 42A and the electrodes 50 are shown with a satin pattern that is thinner than that of the resistor 30 and the first metal layer 41 for ease of explanation.

In the conductive traces 40A, as in the case of the conductive traces 40, the second metal layer 42A is not formed solidly so as to cover the entire upper surface of the first metal layer 41, and the second metal layer 42A is formed in a selected region in the upper surface of the first metal layer 41. That is, the second metal layer 42A is formed in a pattern that is different from that of the first metal layer 41. To be more specific, in FIG. 6, for example, the first metal layer 41 is a linear pattern and the second metal layer 42A is a discrete pattern.

In other words, the second metal layer 42A has a plurality of conductive trace components that are spaced apart from each other. In the conductive traces 40A, the first metal layer 41 extends in the same direction as the direction of line A-A in FIG. 1. The second metal layer 42A includes a plurality of conductive trace components that extend obliquely with respect to the direction of line A-A in FIG. 1. In other words, each conductive trace component constituting the second metal layer 42A is arranged obliquely with respect to the direction in which the first metal layer 41 extends.

The angle of inclination of each conductive trace component of the second metal layer 42A with respect to the direction in which the first metal layer 41 extends is, for example, 45 degrees, but the angle may be any angle, depending on the direction in which the stress is to be produced. Also, the second metal layer 42A may include conductive trace components having varying angles of inclination with respect to the direction in which the first metal layer 41 extends.

In this way, in the conductive traces 40A, in which the second metal layer 42A is laminated over the first metal layer 41, the direction of stress to be produced at the interface between the first metal layer 41 and the second metal layer 42A can be controlled by forming the second metal layer 42A in a pattern that is different from that of the first metal layer 41. As a result of this, the same effects as those of the first embodiment can be gained.

Note that each part constituting the second metal layer 42A may have a wavy pattern, and these individual wavy patterns may be arranged discretely. That is, the first embodiment and modification 1 can be combined as needed.

Although a preferred embodiment and other forms of the present disclosure have been described above in detail as examples, the present disclosure is by no means limited to these examples, and a variety of modifications and replacements can be introduced to the above examples without departing from the scope set forth in the claims.

For example, the second metal layer according to the present disclosure may have any pattern other than a wavy pattern or a discrete pattern, as long as the pattern is different from that of the first metal layer.

Also, the present disclosure is applicable to strain gauges with multiple resistors formed on a substrate. The present disclosure can also be applied to, for example, a strain gauge that forms a half-bridge circuit with two resistors formed on a substrate. Alternatively, the present disclosure is also applicable to, for example, a strain gauge that forms a full-bridge circuit with four resistors formed on a substrate.

This international application claims priority to Japanese Patent Application No. 2020-174819, filed Oct. 16, 2020, the entire contents of which are incorporated herein by reference.

REFERENCE SIGNS LIST

1, 1A strain gauge
10 substrate
10*a* upper surface
20 functional layer
30 resistor
30*e*$_1$, 30*e*$_2$ end
40, 40A conductive trace
50 electrode
41, 51 first metal layer
42, 42A, 52 second metal layer
60 cover layer

The invention claimed is:

1. A strain gauge comprising:
a flexible substrate;
a resistor formed on the substrate; and
a pair of electrodes formed on the substrate and electrically connected with the resistor via conductive traces,
wherein the conductive traces include a first metal layer and a second metal layer formed over an upper surface of the first metal layer,
wherein the second metal layer is formed in a pattern that is different from a pattern of the first metal layer, and
wherein, in plan view, part of the upper surface of the first metal layer is exposed from both ends of the second metal layer.

2. The strain gauge according to claim 1, wherein, in plan view, the second metal layer includes a part that extends obliquely with respect to a direction in which the first metal layer extends.

3. The strain gauge according to claim 1, wherein the second metal layer has a wavy pattern.

4. The strain gauge according to claim 1, wherein the second metal layer has a discrete pattern.

5. The strain gauge according to claim 1, wherein the first metal layer is formed integrally with the resistor by using a same material.

6. The strain gauge according to claim 1, wherein the second metal layer is made of a material that has greater elasticity than a material of the first metal layer.

7. The strain gauge according to claim 1, wherein the second metal layer is made of a material having a lower resistance than a material of the first metal layer.

8. The strain gauge according to claim 1, wherein a width of the first metal layer is 10 μm or more and 100 μm or less.

9. The strain gauge according to claim 1, wherein the conductive traces electrically connect each end of the resistor in a grid width direction with a corresponding one of the pair of electrodes.

10. The strain gauge according to claim 1, wherein the resistor is formed with a film containing Cr, CrN, and Cr$_2$N.

11. The strain gauge according to claim 10, wherein a gauge factor is 10 or more.

12. The strain gauge according to claim 10, wherein the CrN and the $Cr_2N$ contained in the resistor are 20% or less by weight.

13. The strain gauge according to claim 12, wherein a proportion of the $Cr_2N$ in the CrN and the $Cr_2N$ is 80% or more by weight and less than 90% by weight.

14. The strain gauge according to claim 1, wherein the both ends of the second metal layer oppose each other in a direction perpendicular to a longitudinal direction of the second metal layer.

15. The strain gauge according to claim 1, wherein the part of the upper surface of the first metal layer exposed from the second metal layer extends along a longitudinal direction of the first metal layer.

16. The strain gauge according to claim 1, wherein a width of the second metal layer in a direction perpendicular to a longitudinal direction of the second metal layer is smaller than a width of the first metal layer in a direction perpendicular to a longitudinal direction of the first metal layer.

\* \* \* \* \*